(12) United States Patent
Perry et al.

(10) Patent No.: US 9,681,123 B2
(45) Date of Patent: Jun. 13, 2017

(54) TIME-OF-FLIGHT PHASE-OFFSET CALIBRATION

(71) Applicant: MICROSOFT TECHNOLOGY LICENSING, LLC, Redmond, WA (US)

(72) Inventors: Travis Perry, Menlo Park, CA (US); Cyrus Bamji, Fremont, CA (US); Mike Fenton, Palo Alto, CA (US); Karen Cheng, Mountain View, CA (US); Michael Anthony Hall, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 132 days.

(21) Appl. No.: 14/245,751

(22) Filed: Apr. 4, 2014

(65) Prior Publication Data

US 2015/0288955 A1    Oct. 8, 2015

(51) Int. Cl.
| | |
|---|---|
| *H04N 17/00* | (2006.01) |
| *G01S 17/02* | (2006.01) |
| *G01S 17/89* | (2006.01) |
| *G01S 7/491* | (2006.01) |
| *G01S 7/497* | (2006.01) |
| *H04N 13/02* | (2006.01) |

(52) U.S. Cl.
CPC .......... *H04N 17/002* (2013.01); *G01S 7/497* (2013.01); *G01S 7/4915* (2013.01); *G01S 17/02* (2013.01); *G01S 17/89* (2013.01); *H04N 13/0246* (2013.01); *H04N 13/0253* (2013.01)

(58) Field of Classification Search
CPC ............. H04N 17/002; H04N 13/0246; H04N 13/0253; G01S 17/02; G01S 17/89; G01S 7/4915; G01S 7/497
See application file for complete search history.

(56) References Cited

U.S. PATENT DOCUMENTS

| | | |
|---|---|---|
| 7,936,449 B1 | 5/2011 | Bamji et al. |
| 8,274,037 B2 | 9/2012 | Ritter et al. |
| 8,482,722 B2 | 7/2013 | Min et al. |

(Continued)

FOREIGN PATENT DOCUMENTS

WO    2013010913 A1    1/2013

OTHER PUBLICATIONS

Fuchs, Stefan et al., "Extrinsic and Depth Calibration of ToF-Cameras" Computer Vision and Pattern Recognition, IEEE Conference on CVPR 2008, Jun. 2008, 6 pages.

*Primary Examiner* — Michael Teitelbaum
(74) *Attorney, Agent, or Firm* — Alleman Hall Creasman & Tuttle LLP (57) ABSTRACT

A method to calibrate an imaging array of a time-of-flight depth camera includes the act of modulating emission from a light source of the camera while synchronously biasing the imaging array. In this method, the modulated emission reflects from a compact reflector positioned a known distance from the camera and passes through an optical diffuser en route to the imaging array. For each pixel of the imaging array, a correction term is stored, which brings the output from that pixel into agreement with the actual distance between the camera and the compact reflector.

12 Claims, 5 Drawing Sheets

(56) References Cited

U.S. PATENT DOCUMENTS

| | | | |
|---|---|---|---|
| 2008/0309914 A1* | 12/2008 | Cantin | G01S 17/10 356/4.01 |
| 2011/0292370 A1 | 12/2011 | Hills et al. | |
| 2012/0013887 A1 | 1/2012 | Xu et al. | |
| 2012/0092485 A1 | 4/2012 | Meinherz et al. | |
| 2012/0315965 A1* | 12/2012 | Bathiche | A63F 3/00529 463/1 |
| 2014/0160459 A1* | 6/2014 | Huber | G01S 17/08 356/5.01 |

* cited by examiner

TIME-OF-FLIGHT PHASE-OFFSET CALIBRATION

BACKGROUND

In recent years, time-of-flight depth-imaging technology has become more accurate and more affordable. These advances are a consequence of improved imaging-array fabrication and intelligent post-processing, which garners improved signal-to-nose levels from the raw output of the array. In some cases, the output from every pixel of a time-of-flight imaging array may be subject to real-time phase correction based on calibration data recorded for that array. The calibration data is typically recorded in large rooms at the factory using expensive, precision equipment, and may be optimized for a subset of the useful operating parameters of the array.

SUMMARY

One embodiment of this disclosure provides a method to calibrate an imaging array of a time-of-flight depth camera. The method includes the act of modulating emission from a light source of the camera while synchronously biasing the imaging array. In this method, the modulated emission reflects from a compact reflector positioned a known distance from the camera and passes through an optical diffuser en route to the imaging array. For each pixel of the imaging array, a correction term is stored, which brings the output from that pixel into agreement with the actual distance between the camera and the compact reflector.

This summary is provided to introduce a selection of concepts in simplified form that are further described below in the detailed description. This summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Aspects of this disclosure will now be described by example and with reference to the illustrated embodiments listed above. Components, process steps, and other elements that may be substantially the same in one or more embodiments are identified coordinately and are described with minimal repetition. It will be noted, however, that elements identified coordinately may also differ to some degree. It will be further noted that the drawing figures included in this disclosure are schematic and generally not drawn to scale. Rather, the various drawing scales, aspect ratios, and numbers of components shown in the figures may be purposely distorted to make certain features or relationships easier to see.

Figure 1:
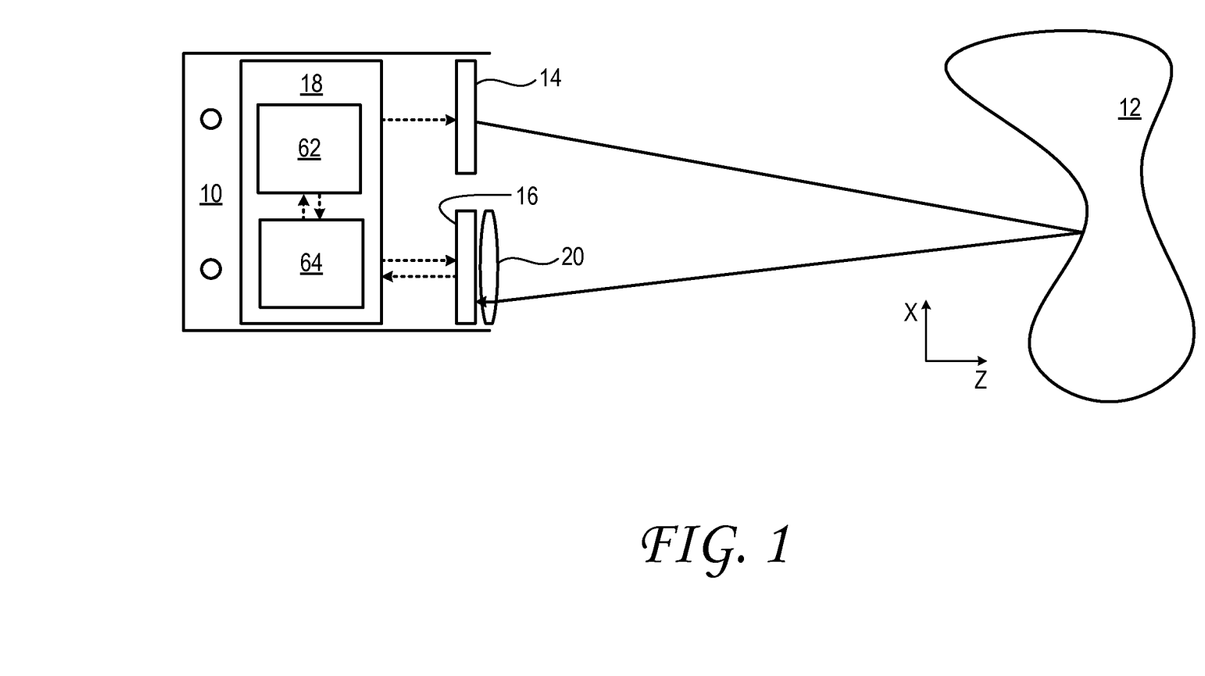
FIG. 1 shows aspects of an example time-of-flight depth camera.

FIG. 1 shows aspects of an example time-of-flight depth camera 10 configured to image a subject 12. In some embodiments, the depth camera may be positioned from 0.1 to 5 meters away from subject, though other depth ranges are contemplated as well. The depth cameras used in connection with this disclosure are applicable to a broad range of subjects—from simple geometric structures such as walls, doors, and ceilings, to complex subjects such as human beings. In some scenarios, an imaged subject may include both foreground and background portions.

As shown in FIG. 1, depth camera 10 includes a modulated light source 14, an imaging array 16, and a controller 18. The depth camera may also include various other components, such as an objective lens 20 and/or wavelength filter, which may be set in front of the array.

Modulated light source 14 is configured to irradiate subject 12 with modulated probe light. The probe light can be modulated according to virtually any periodic modulation waveform, including, but not limited to a sinusoidally modulated waveform. The nature of the modulated light source may differ in the various embodiments of this disclosure. In some embodiments, the modulated light source may include a modulated laser, such as an infrared (IR) or near-infrared (NIR) laser—e.g., an edge emitting laser or vertical-cavity surface-emitting laser (VCSEL). In other embodiments, the modulated light source may include one or more high-power light-emitting diodes (LEDs).

Imaging array 16 includes an array of depth-sensing pixels. The imaging array is configured to receive, in a typical use scenario, at least some of the pulsed or modulated probe light reflected back from subject 12. Each pixel of the array is configured to present an output signal dependent on distance from the depth camera to the locus of subject 12 imaged onto that pixel. Such distance is referred to herein as 'depth'.

Continuing in FIG. 1, controller 18 includes logic to provide modulated drive signals to light source 14 and to imaging array 16, to synchronize the operation of these components. In particular, the controller logic modulates emission from the light source while synchronously biasing the electrodes of the imaging array (vide infra). The controller is also configured to read the output signal from each pixel of the imaging array to enable computation of a depth map of subject 12. In some embodiments, repeated depth imaging may be used to assemble a time-resolved series of depth maps—i.e., depth video.

Figure 2:
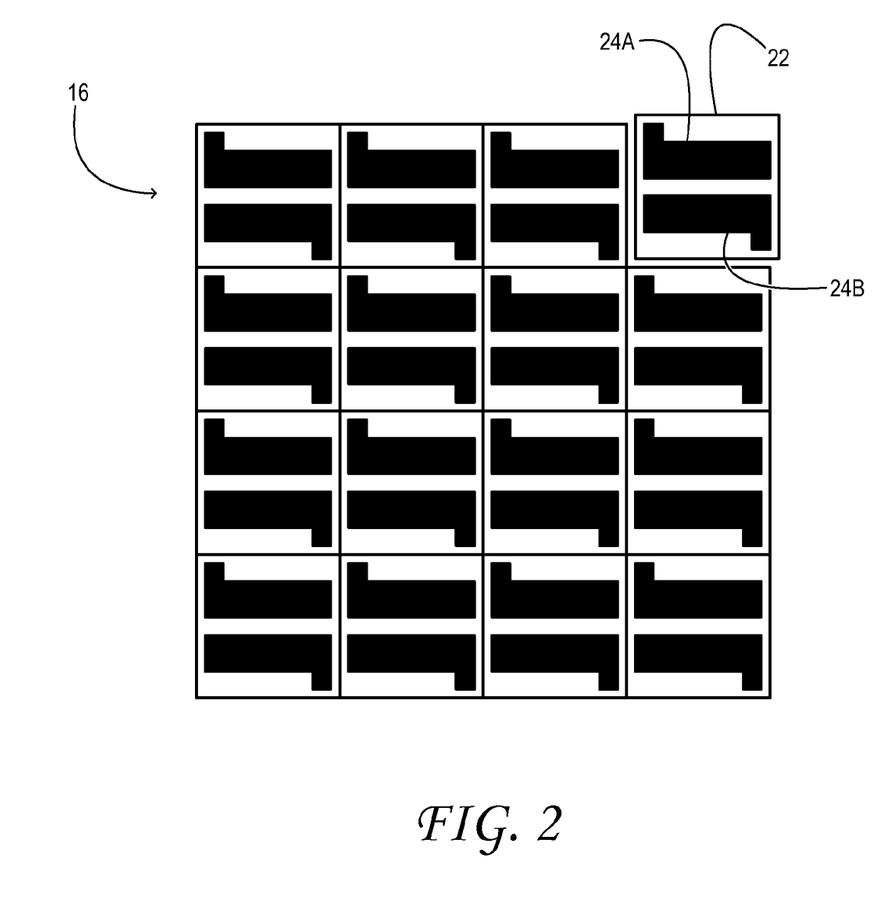
FIG. 2 shows aspects of an example imaging array of a time-of-flight depth camera.

FIG. 2 shows aspects of imaging array 16 in one embodiment. In particular, the drawing shows an array of pixels 22. Each pixel includes a first pixel element 24A, an adjacent second pixel element 24B, and may also include additional pixel elements not shown in the drawing. Each pixel element may include one or more finger gates, transfer gates and/or collection nodes epitaxially formed on a semiconductor substrate. The pixel elements of each pixel may be addressed so as to provide two or more integration periods synchronized to the pulsed emission from the modulated light source. The integration periods may differ in phase and/or total integration time. Based on the relative amount of differential (and in some embodiments common mode) charge accumulated on the pixel elements during the different integration periods, the distance out to the reflecting locus of the subject may be assessed. In one embodiment, the modulated light source and first pixel element 24A are energized synchronously, while second pixel element 24B is energized 180° out of phase with respect to the first pixel element. Based on the relative amount of charge accumulated on the first and second pixel elements, the phase angle of the reflected light pulse received in the imaging array is computed versus the probe modulation. From that phase angle, the distance out to the reflecting locus may be assessed.

Naturally, depth camera 10 may be engineered with high precision. Nevertheless, manufacturing artifacts may result in unpredictable electrical path delays in imaging array 16 or its circuit board, and differences in quantum efficiency among the various pixel elements of the array. Such effects are manifest as a phase or depth offset that varies for each pixel of the array. Fortunately, the value of each phase offset may be discoverable, and correctable, by way of a calibration procedure enacted on the imaging array prior to runtime. The product of the calibration procedure may take the form of a data file having as many entries as there are pixels in the array. Each entry may provide the appropriate phase-offset correction for the corresponding pixel. At runtime, the output for each pixel as received may be corrected based on the phase-offset correction, which is read from the data file.

Figure 3:
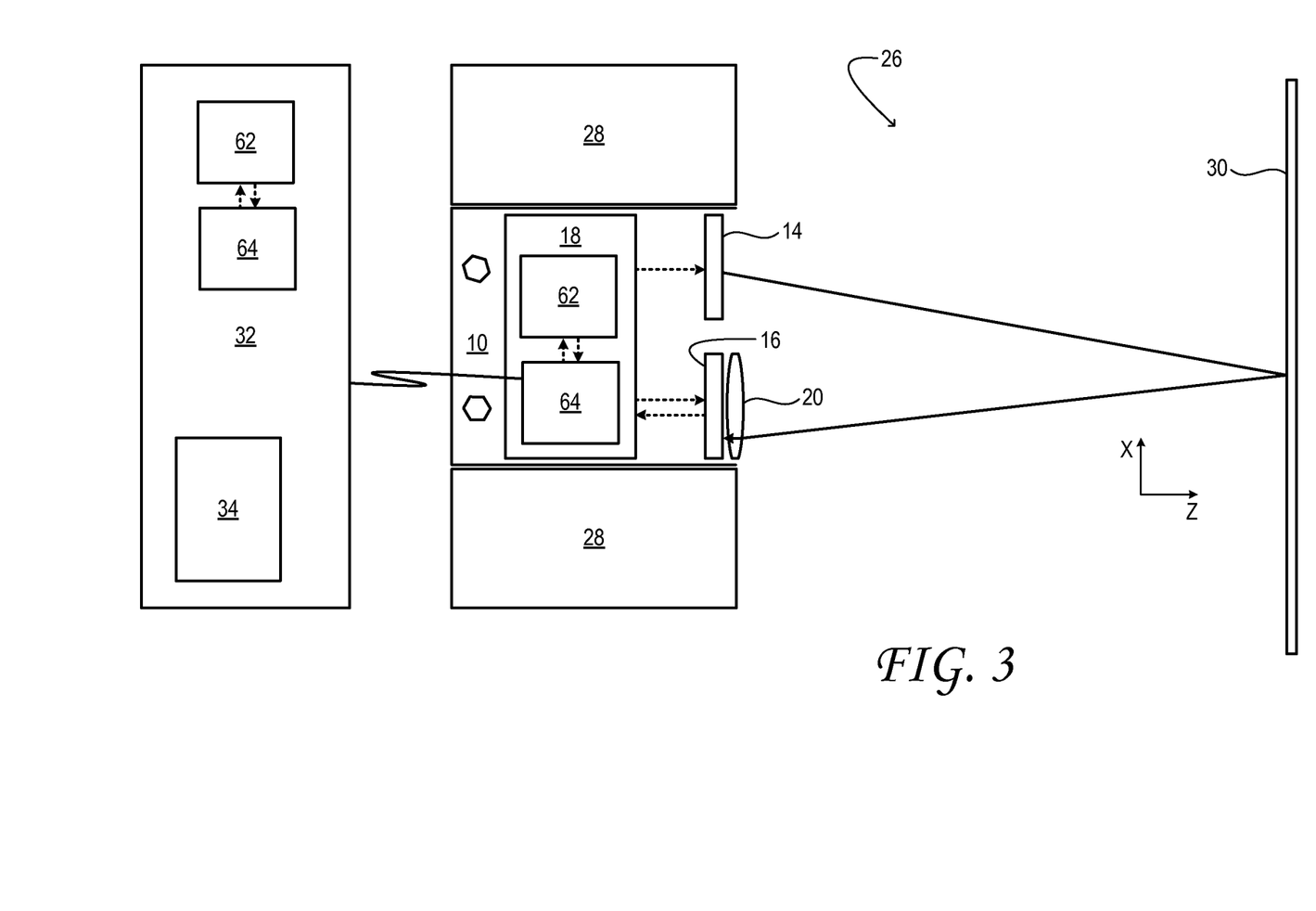
FIG. 3 shows aspects of an example calibration assembly for calibrating an imaging array of a time-of-flight depth camera.

FIG. 3 shows aspects of an example calibration assembly 26 for calibrating an imaging array 16 of depth camera 10. The calibration assembly includes a camera rig 28 to which the depth camera is rigidly held. The calibration assembly also includes a reflective target panel 30 in the form of a wall situated a known distance from the camera and orthogonal to the optical axis Z of the camera. Calibration computer system 32 is operatively coupled to the depth camera. Logic in the calibration computer is configured to receive, for each pixel of the array, an output from that pixel and to store a correction term responsive to the output. The correction term is such as to bring the output into agreement with the actual distance between the imaging array and the reflective panel. In this example, the set of correction terms is stored in calibration file 34.

Calibration assembly 26 illustrates a workable approach for calibration of a time-of-flight depth camera, but admits of several disadvantages. First, it will be noted that objective lens 20 maps image content received at a given angle to a corresponding pixel of imaging array 16. In general, the objective lens is also subject to manufacturing tolerances and may require calibration to accurately define the mapping. As the light collected at each pixel is received at a different angle and guided to that pixel based on the characteristics of the lens, any non-ideality of the lens will manifest as an additional contribution to the phase offset, varying from pixel to pixel. Possible remedies for this error include performing the phase-offset calibration once it is assured that the lens will no longer move relative to the imaging array, or, calibrating the lens prior to phase-offset calibration. Both of these remedies significantly complicate the calibration process.

A second disadvantage of calibration assembly 26 arises from the fact that some time-of-flight cameras provide illumination which is asymmetric with respect to the optical axis of the imaging array (as shown in the example of FIG. 3). When illumination is symmetric about the optical axis, the output phase is a function of the modulation frequency f, the speed of light c, and the radial calibration distance Z, $$\varphi = 4\pi Z f/c.$$

When the illumination is asymmetric, there is an additional phase offset that depends on the mean displacement between the center of the objective lens and the laser illumination area. This causes a systematic error that varies with pixel position in the array. A remedy for this issue, with calibration assembly 26, is to increase the distance between depth camera 10 and reflective target panel 30. However, to preserve the field of view over which the calibration is useful, a correspondingly larger reflective target panel must be used. Naturally, larger reflective target panels and calibration assemblies tend to increase the overhead associated with array calibration in a manufacturing environment. Moreover, the need for large reflective target panels and calibration assemblies effectively confines calibration to the factory, making it impractical for the user to calibrate or recalibrate in the field. Calibration at a different frequency f may be desired, for instance, if the depth camera is to be used in a significantly different depth range than the range for which it was previously calibrated.

A third disadvantage of calibration assembly 26 is that reflective target panel 30 must be flat, smooth, and aligned accurately, at least to the tolerances expected of the calibration—e.g., ±1 millimeter. Naturally, the flatness, smoothness, and alignment constraints increases calibration costs, particularly for depth cameras intended to operate over a large field of view. Increased calibration costs make it unlikely, in turn, that an end user would have the wherewithal to calibrate or recalibrate in the field.

Figure 4:
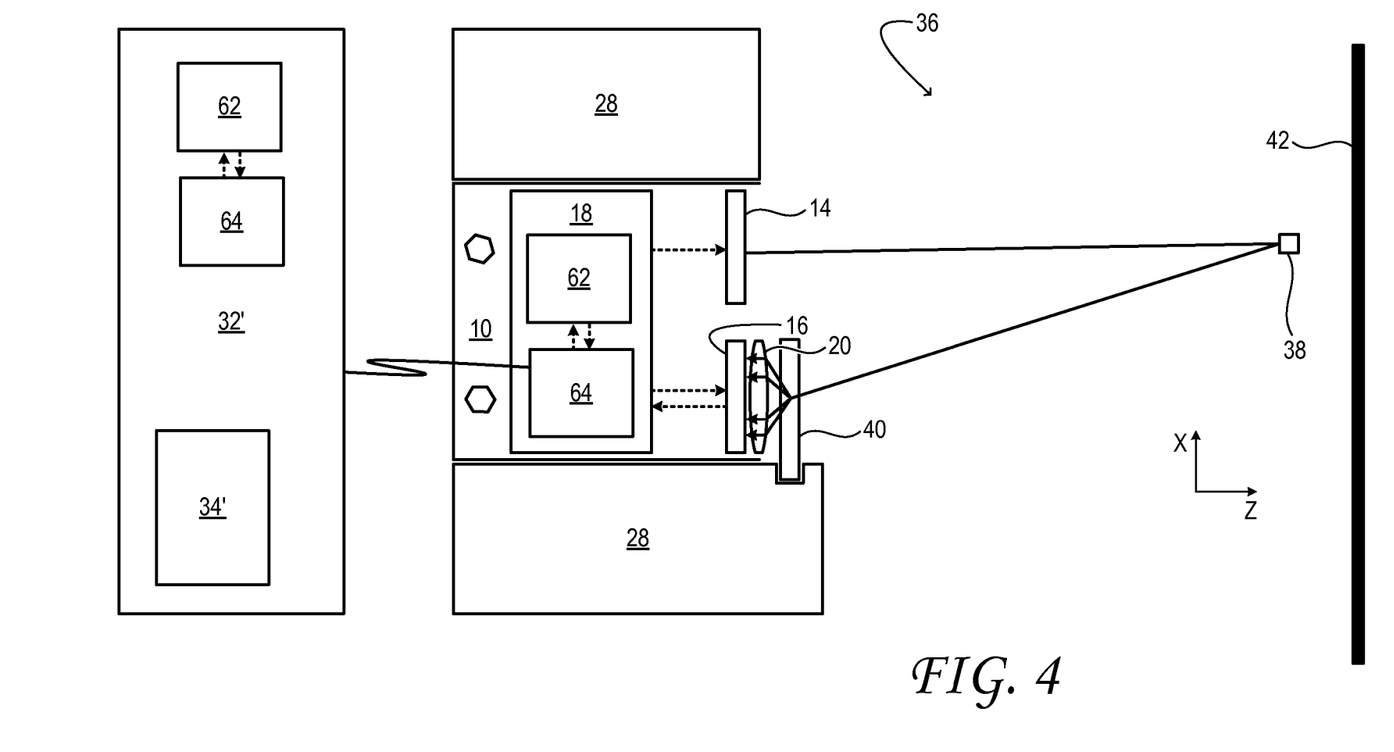
FIG. 4 shows aspects of another example calibration assembly for calibrating an imaging array of a time-of-flight depth camera.

FIG. 4 shows aspects of another example calibration assembly 36 for calibrating a time-of-flight depth camera 10. This calibration assembly does not require a reflective target panel. Instead, it uses a compact reflector 38 arranged a known distance in front of the camera, and an optical diffuser 40 arranged over the imaging array—i.e., close to and along (intersecting) the optical axis of the array. In this configuration, modulated emission from the light source reflects from the compact reflector and passes through the optical diffuser en route to the imaging array. Optionally, a light trap 42—in may be situated behind the compact reflector. The light trap may take the form of a black wall or curtain, or light-absorbing baffles arranged in a chevron configuration. Advantageously this calibration method calibrates the phase offsets in the depth-camera system independent of geometric imperfections in the lens, reflective target, etc. Thus the overall system may calibrated in two independent steps: first the phase-offset calibration described herein, and in a second independent step, calibration of imperfections of the objective lens and lens assembly.

The nature of compact reflector 38 may differ in the different embodiments of this disclosure. In some embodiments, the compact reflector is a mirror. In other embodiments, the compact reflector is a retroreflector. Virtually any type of structural support may be used to hold the diffuser and compact reflector at fixed positions relative to the depth camera. In one non-limiting embodiment, rig 28 may include structure to accommodate the diffuser and/or compact reflector.

By virtue of the high reflectance of the compact reflector relative to other objects in the field of view of the depth camera, most or effectively all of the light reaching imaging array 16 during calibration is light that has been emitted from light source 14 and reflected from compact reflector 38. Such light travels a known round-trip distance and reaches optical diffuser 40, which reorients the light into a broad range of angles to be received in objective lens 20. The lens maps the light received onto the pixels of the imaging array. Because the time-of-flight measurement is ratiometric, it is not important that each pixel receive the same amount of light. The significant fact is that the diffuser scatters onto each pixel only light that has travelled effectively the same distance. If not for manufacturing tolerances, the phase output for each pixel would be exactly the same, corresponding to the distance from the light source out to the compact reflector and back to the imaging array. Accordingly, correction terms are computed in calibration computer system 32', to appropriately correct the phase outputs. More particularly, the logic of calibration computer system 32' is configured to receive, for each pixel of the array, an output from that pixel and to store a correction term responsive to the output. The correction term is such as to bring the output into agreement with an actual distance between the imaging array and the compact reflector. The set of correction terms may be stored in calibration file 34', stored in internal or flash memory of the depth camera, or both.

The configurations described above enable various methods to calibrate an imaging array of a time-of-flight depth camera or otherwise support the calibration of a depth camera. Accordingly, some such methods are now described, by way of example, with continued reference to the above configurations. It will be understood, however, that the methods here described, and others equally within the scope of this disclosure, may be enabled by other configurations as well.

Figure 5:
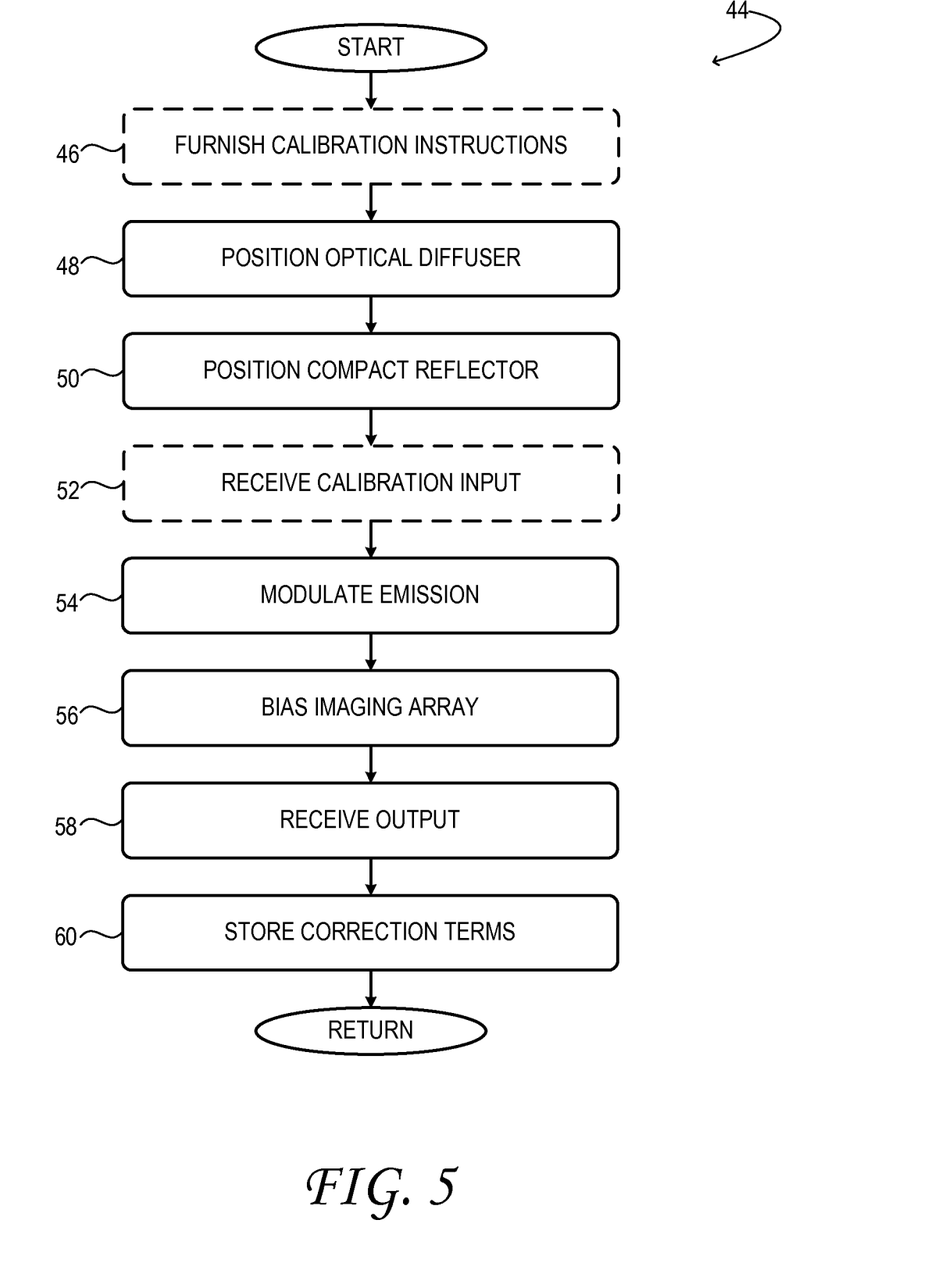
FIG. 5 illustrates an example method for calibrating an imaging array of a time-of-flight depth camera.

FIG. 5 illustrates an example method 44 to calibrate an imaging array of a time-of-flight depth camera. At optional step 46 of method 44, instructions for calibrating the imaging array are furnished. In one embodiment, the instructions are furnished in literature supplied with the camera. In other embodiments, the instructions are shown on an electronic display operatively coupled to the camera or the calibration computer. The instructions may direct the user of the camera to take any appropriate action to enable calibration of the imaging array according to the approaches described herein. For example, the instructions may direct the user to attach an optical diffuser to the camera or otherwise position an optical diffuser in front of the imaging array of the camera. The instructions may also direct the user to position a compact reflector some distance away from the camera—e.g., a specified distance, a distance based on the depth range of subsequent depth imaging, or an arbitrary distance.

At 48 an optical diffuser is positioned in front of the imaging array of the camera to be calibrated. In one embodiment, the optical diffuser is coupled to the camera—e.g., placed in a lens mount or filter slot of the camera. In another embodiment, the optical diffuser is coupled to a rig, which holds the camera during the calibration process.

At 50 a compact reflector is positioned in the field of view of the camera, at some distance away from the camera. In some embodiments, the distance between the camera and the compact reflector may be specified—e.g. 200 centimeters, 2 meters, etc. In some embodiments, the distance between the camera and the compact reflector may be commensurate with the depth range of subsequent depth imaging. In some embodiments, the person calibrating the camera may decide on a distance, according to this or another criterion, and later provide the distance as input to the logic supporting the calibration procedure. Accordingly, at 52 input as to the distance between the camera and the compact reflector is received by the camera or calibration computer system. In some embodiments, the position of the camera for purposes of measurement may be the position of the objective lens of the camera. In other embodiments, the more easily measured position of the optical diffuser may be used instead.

At 54 of method 44, emission from the light source of the camera is modulated by some periodic waveform—e.g., pulse modulated, sinusoidally modulated, etc. In some embodiments, the emission may be modulated at a changed frequency—i.e., a frequency different from that previously used for calibration and/or depth imaging. It will be noted here that the frequency of modulation is related to the operational depth range of the camera, so recalibration at a new frequency may be used when depth imaging at a new range is anticipated.

At 56 the imaging array of the camera is biased synchronously with the modulated emission of the light source, as described hereinabove. As illustrated in the configuration examples above, some of the modulated emission is distributed so as to reflect from a compact reflector positioned a known distance from the camera. The reflected emission then passes through an optical diffuser en route to the imaging array.

At 58 a raw output is received for each pixel of the imaging array. In some embodiments, the raw output may correspond to an apparent distance from the camera to the compact reflector. In some embodiments, the raw output may be expressed as a phase angle convertible to a depth coordinate via downstream processing. Often the raw output may not agree with the actual distance between the camera and the compact reflector. Accordingly, at 60 of method 44, an appropriate correction term for each pixel of the array is computed and stored.

Each correction term is a term that, when applied to the output of the corresponding pixel, brings the output into agreement with the actual distance between the camera and the compact reflector. In one embodiment, each correction term is a phase-offset correction added to the output to bring the output into agreement with the actual distance. It will be noted that the term 'agreement with the actual distance' should be interpreted broadly, consistent with known ways in which a data structure (the output) can accurately and usefully represent a physical quantity (the distance). For example, the output may agree with the distance if it is proportional to the distance—i.e., if it agrees to within a factor which is the same for all pixels. In another example, the output may agree with the distance if it agrees on addition of a constant term which is the same for every pixel. Numerous other modes of agreement will be understood by those having ordinary skill in the art.

In one embodiment, the set of correction terms may be stored in a data file of a calibration computer system operatively coupled to the depth camera being calibrated. In some embodiments, the set of correction terms may be stored in a medium accessible to the depth camera for runtime retrieval by logic of the depth camera. For example, the correction terms may be stored directly in non-volatile memory of the depth camera.

In one embodiment, each correction term P0 is given by $$P0 = \mathrm{mod}\left(2\pi \frac{Z}{f/2c}\left(1 + \sqrt{1 + (D/Z)^2}\right) - \theta_{meas}, 2\pi\right),$$

where c is the speed of light in air, f is the focal length of the optical system imaging onto the sensor array, Z is the known depth of the compact reflector relative to the center of the optical system, D is the lateral distance between the objective lens center and the exit pupil of the emitter, and $\theta_{meas}$ is the measured round-trip phase including the unknown offset. In the case of multiple emission sources, emission center is determined by taking the "center of mass" of all sources by weighting their positions relative to the objective lens center by the output power they emit. The emission sources can be placed anywhere, even on opposite sides of the lens, or asymmetrically around the camera—e.g., two emission sources on one side and one on the other, one emission source on either side, one on the top, and so on.

It will be noted that phase-based depth-imaging is sometimes enacted using two or more different modulation frequencies. Accordingly, in some embodiments, phase-offset calibration may also be carried out at multiple frequencies. For each frequency and each pixel of the imaging array, a different correction term may be stored in the calibration file. Alternatively, a plurality of calibration files may be stored, each corresponding to a different modulation frequency. At runtime, the final distance is computed using the corrected phases for each of modulation frequency used in the measurement.

As evident from the foregoing description, the methods and processes described herein may be tied to a computing system of one or more computing devices. Such methods and processes may be implemented as a computer-application program or service, an application-programming interface (API), a library, and/or other computer-program product.

FIGS. 1 and 4 show aspects of controller 18 and calibration computer systems 32 and 32'—compute systems configured to support the methods and processes described herein. Each compute system includes a logic machine 62 and an instruction-storage machine 64. Each compute system may optionally include a display subsystem, an input subsystem, a communication subsystem, and other components not shown in the drawings.

Logic machines 62 include one or more physical devices configured to execute instructions. For example, a logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

Logic machines 62 may include one or more processors configured to execute software instructions. Additionally or alternatively, a logic machine may include one or more hardware or firmware logic machines configured to execute hardware or firmware instructions. Processors of the logic machines may be single-core or multi-core, and the instructions executed thereon may be configured for sequential, parallel, and/or distributed processing. Individual components of the logic machines optionally may be distributed among two or more separate devices, which may be remotely located and/or configured for coordinated processing. Aspects of a logic machine may be virtualized and executed by remotely accessible, networked computing devices configured in a cloud-computing configuration.

Instruction-storage machines 64 include one or more physical devices configured to hold instructions executable by an associated logic machine 62 to implement the methods and processes described herein. When such methods and processes are implemented, the state of the instruction-storage machine may be transformed—e.g., to hold different data. An instruction-storage machine may include removable and/or built-in devices; it may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. An instruction-storage machine may include volatile, nonvolatile, dynamic, static, read/write, read-only, random-access, sequential-access, location-addressable, file-addressable, and/or content-addressable devices.

It will be appreciated that each instruction-storage machine 64 includes one or more physical devices. However, aspects of the instructions described herein alternatively may be propagated by a communication medium (e.g., an electromagnetic signal, an optical signal, etc.) that is not stored via a storage medium.

Aspects of logic machines 62 and instruction-storage machines 64 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, a display subsystem may be used to present a visual representation of data held by an associated instruction-storage machine 64. This visual representation may take the form of a graphical user interface (GUI). As the herein described methods and processes change the data held by the storage machine, and thus transform the state of the storage machine, the state of the display subsystem may likewise be transformed to visually represent changes in the underlying data. A display subsystem may include one or more display devices utilizing virtually any type of technology. Such display devices may be combined with a logic machine 62 and/or instruction-storage machine 64 in a shared enclosure, or such display devices may be peripheral display devices.

When included, an input subsystem may comprise or interface with one or more user-input devices such as a keyboard, mouse, touch screen, or game controller. In some embodiments, an input subsystem may comprise or interface with selected natural user-input componentry. Such componentry may be integrated or peripheral, and the transduction and/or processing of input actions may be handled on- or off-board.

When included, a communication subsystem may be configured to communicatively couple a compute system with one or more other compute systems. A communication subsystem may include wired and/or wireless communication devices compatible with one or more different communication protocols. As non-limiting examples, a communication subsystem may be configured for communication via a wireless telephone network, or a wired or wireless local- or wide-area network. In some embodiments, the communication subsystem may allow a compute system to send and/or receive messages to and/or from other devices via a network, such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method to calibrate an imaging array of a depth-imaging time-of-flight camera, the camera including a modulated light source, the method comprising:

modulating emission from the light source while synchronously biasing the imaging array, the modulated emission reflecting from a reflector positioned a known distance from the camera and passing through an optical diffuser en route to the imaging array; and for each pixel of the imaging array, storing a correction term that results in a representation of actual distance between the camera and the reflector, the correction term being computed based on the emission having traveled an equal distance to each pixel of the imaging array.

2. The method of claim 1, wherein each correction term is stored in a medium accessible to the camera for runtime retrieval by the camera.

3. The method of claim 2, wherein the medium includes non-volatile memory of the camera.

4. The method of claim 1, wherein the optical diffuser is coupled to the camera.

5. The method of claim 1, wherein modulating the emission from the light source comprises modulating at a frequency different from a frequency previously used for calibration of the imaging array.

6. The method of claim 1, wherein the correction term is a phase-offset correction.

7. The method of claim 1, wherein the representation is a result of adding the correction term of each pixel to output from that pixel.

8. The method of claim 1, wherein the representation equals the actual distance on addition of a constant term common to every pixel of the imaging array.

9. A method to recalibrate an imaging array of a depth-imaging time-of-flight camera, the camera including a modulated light source, the method comprising:

modulating emission from the light source while synchronously biasing the imaging array, the modulated emission reflecting from a reflector positioned a known distance from the camera and passing through an optical diffuser coupled to the camera en route to the imaging array; and for each pixel of the imaging array, storing a correction term that results in a representation of actual distance between the camera and the reflector, the correction term being computed based on the emission having traveled an equal distance to each pixel of the imaging array.

10. The method of claim 9, wherein storing the correction term includes storing directly in non-volatile memory of the camera.

11. The method of claim 9, further comprising receiving input at the camera as to the distance between the camera and the reflector.

12. The method of claim 9, further comprising furnishing instructions to a user of the camera as to positioning the reflector.

* * * * *